(12) United States Patent
Kuriyama

(10) Patent No.: US 11,864,079 B2
(45) Date of Patent: Jan. 2, 2024

(54) SYSTEM FOR COMMUNICATING INFORMATION RELATING TO LONG PERIOD GROUND MOTION, SERVER FOR COMMUNICATING INFORMATION RELATING TO LONG PERIOD GROUND MOTION, MOBILE TERMINAL, AND METHOD FOR COMMUNICATING INFORMATION RELATING TO LONG PERIOD GROUND MOTION

(71) Applicant: RC Solution Co., Tokyo (JP)

(72) Inventor: Akira Kuriyama, Tokyo (JP)

(73) Assignee: RC Solution Co., Tokyo (JP)

( * ) Notice: Subject to any disclaimer, the term of this patent is extended or adjusted under 35 U.S.C. 154(b) by 388 days.

(21) Appl. No.: 17/276,608

(22) PCT Filed: Aug. 2, 2019

(86) PCT No.: PCT/JP2019/030444
§ 371 (c)(1),
(2) Date: Mar. 16, 2021

(87) PCT Pub. No.: WO2020/059321
PCT Pub. Date: Mar. 26, 2020

(65) Prior Publication Data
US 2022/0046401 A1 Feb. 10, 2022

(30) Foreign Application Priority Data
Sep. 20, 2018 (JP) ................................. 2018-175688

(51) Int. Cl.
*H04W 4/90* (2018.01)
*G01V 1/00* (2006.01)
*G08B 21/10* (2006.01)

(52) U.S. Cl.
CPC .............. *H04W 4/90* (2018.02); *G01V 1/008* (2013.01); *G08B 21/10* (2013.01)

(58) Field of Classification Search
CPC ......... H04W 4/90; H04W 4/33; H04W 4/029; G01V 1/008; G08B 21/10
See application file for complete search history.

(56) References Cited

FOREIGN PATENT DOCUMENTS

| JP | 2011004013 A | * | 1/2011 |
| JP | 2016200937 A | * | 12/2016 |
| JP | 2018-119815 A | | 8/2018 |
| JP | 2018119815 A | * | 8/2018 |

* cited by examiner

*Primary Examiner* — Umair Ahsan
(74) *Attorney, Agent, or Firm* — POLSINELLI PC

(57) ABSTRACT

It is possible to accurately convey information relevant to a long period ground motion to a person staying on each floor of a building. A system 1 for communicating information relating to a long period ground motion acquires information indicating a floor on which a user stays in a building at which the user stays, information relevant to a position and a structure of the building, and information relevant to a state of an earthquake that occurs, and calculates a state of shaking that occurs on the floor of the building at which the user stays due to the long period ground motion to be communicated to the user through a user terminal 3, and thus, information relevant to the long period ground motion can be obtained through the user terminal 3 that the user has.

7 Claims, 8 Drawing Sheets

(A)
| BEACON KEY INFORMATION | BUILDING KEY INFORMATION | INSTALLATION FLOOR INFORMATION | BEACON TRANSMISSION DEVICE POSITION INFORMATION |
|---|---|---|---|

(B)
| USER KEY INFORMATION | TERMINAL KEY INFORMATION | PUSH COMMUNICATION-RELATED INFORMATION | USER PROPERTY INFORMATION | NEARBY DEVICE INFORMATION |
|---|---|---|---|---|

(C)
| BUILDING KEY INFORMATION | BUILDING POSITION INFORMATION | BUILDING PROPERTY INFORMATION | FLOOR MAP INFORMATION | | | |
|---|---|---|---|---|---|---|
| | | | FIRST FLOOR MAP DATA | SECOND FLOOR MAP DATA | ... | N-TH FLOOR MAP DATA |

(D)
| USER KEY INFORMATION | TERMINAL KEY INFORMATION | PUSH COMMUNICATION -RELATED INFORMATION | USER PROPERTY INFORMATION | BUILDING KEY INFORMATION | INSTALLATION FLOOR INFORMATION | BEACON TRANSMISSION DEVICE POSITION INFORMATION |
|---|---|---|---|---|---|---|

FIG.4
(A)
M1
(B)
G1
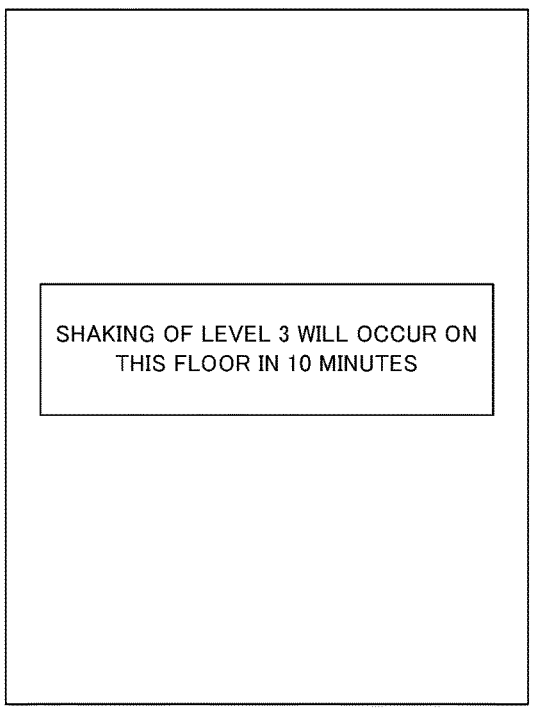
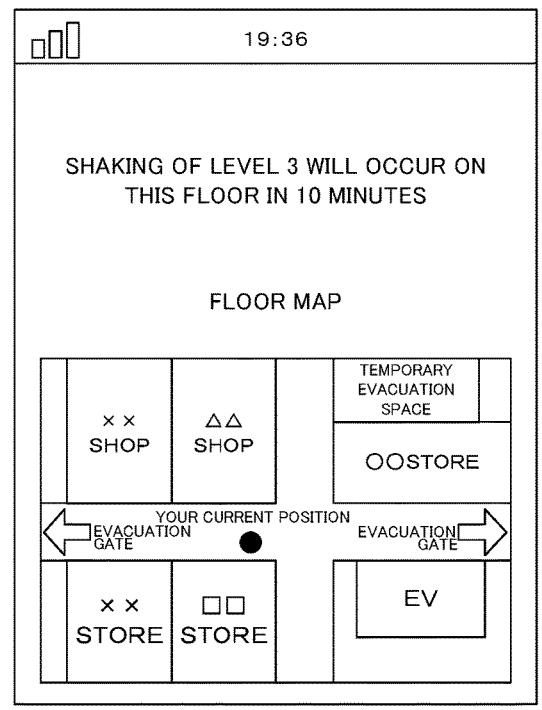

SYSTEM FOR COMMUNICATING INFORMATION RELATING TO LONG PERIOD GROUND MOTION, SERVER FOR COMMUNICATING INFORMATION RELATING TO LONG PERIOD GROUND MOTION, MOBILE TERMINAL, AND METHOD FOR COMMUNICATING INFORMATION RELATING TO LONG PERIOD GROUND MOTION

CROSS REFERENCE TO RELATED APPLICATIONS

This application is a National Phase filing under 35 U.S.C. § 371 of PCT/JP2019/030444 filed on Aug. 2, 2019; which application in turn claims priority to Application No. 2018-175688 filed in Japan on Sep. 20, 2018. The entire contents of each application are hereby incorporated by reference.

TECHNICAL FIELD

The present invention relates to a system for communicating information relating to a long period ground motion, a server for communicating information relating to a long period ground motion, mobile terminal, and a method for communicating information relating to a long period ground motion, in which information relevant to the long period ground motion associated with an earthquake is communicated to a user.

BACKGROUND ART

It is widely known that a long period ground motion that is an earthquake motion having a long cycle may occur in association with the occurrence of an earthquake. Regarding such a long period ground motion, in the related art, a technology for issuing a warning by predicting the occurrence of the long period ground motion or the influence of the long period ground motion is proposed. For example, in Patent Document 1, technology is described in which a device 20 is provided on each floor of a building BLD such as a high building, and in a case where the long period ground motion occurs, a warning reflecting the influence of the long period ground motion on each of the floors is output from the device 20 on each of the floors.

CITATION LIST

Patent Document

Patent Document 1: JP-A-2018-119815

SUMMARY OF THE INVENTION

Technical Problem

However, in the technology of Patent Document 1, the warning relevant to the long period ground motion is output to a person staying on the floor by the device 20 that is regionally provided on each of the floors, and thus, there is a problem that it is difficult to convey information relevant to the long period ground motion to an individual.

The invention has been made in order to solve such problems, and an object thereof is to enable information relevant to a long period ground motion to be accurately conveyed to a person staying on each floor of a building.

Solution to Problem

In order to attain the object described above, in the invention, information indicating a floor on which a user stays in a building at which the user stays, information relevant to a position and a structure of the building, and information relevant to a state of an earthquake that occurs are acquired, a state of shaking that occurs on the floor of the building at which the user stays due to a long period ground motion associated with the earthquake that occurs is calculated by reflecting the floor on which the user stays in the building, the position and the structure of the building, and the state of the earthquake that occurs, on the basis of such information items, and information according to the calculated state of the shaking is communicated to the user through a mobile terminal possessed by the user.

Advantageous Effects of the Invention

According to the invention configured as described above, in a case where a long period ground motion occurs, necessary information is collected, and then, the state of shaking that occurs on a floor of a building at which a user stays due to the long period ground motion is suitably calculated. After that, information according to the state of the shaking is communicated to the user through a terminal possessed by the user, and thus, the user is capable of promptly receiving information through the terminal that the user has, and of explicitly grasping the contents of the information. That is, according to the invention, information relevant to a long period ground motion can be accurately conveyed to a person staying on each floor of a building.

BRIEF DESCRIPTION OF THE DRAWINGS

FIG. 2 is a diagram illustrating contents of records of various databases.

FIG. 4 is a diagram illustrating an example of a message and an information communication screen to be displayed on a user terminal.

MODE FOR CARRYING OUT THE INVENTION

First Embodiment

Figure 1:
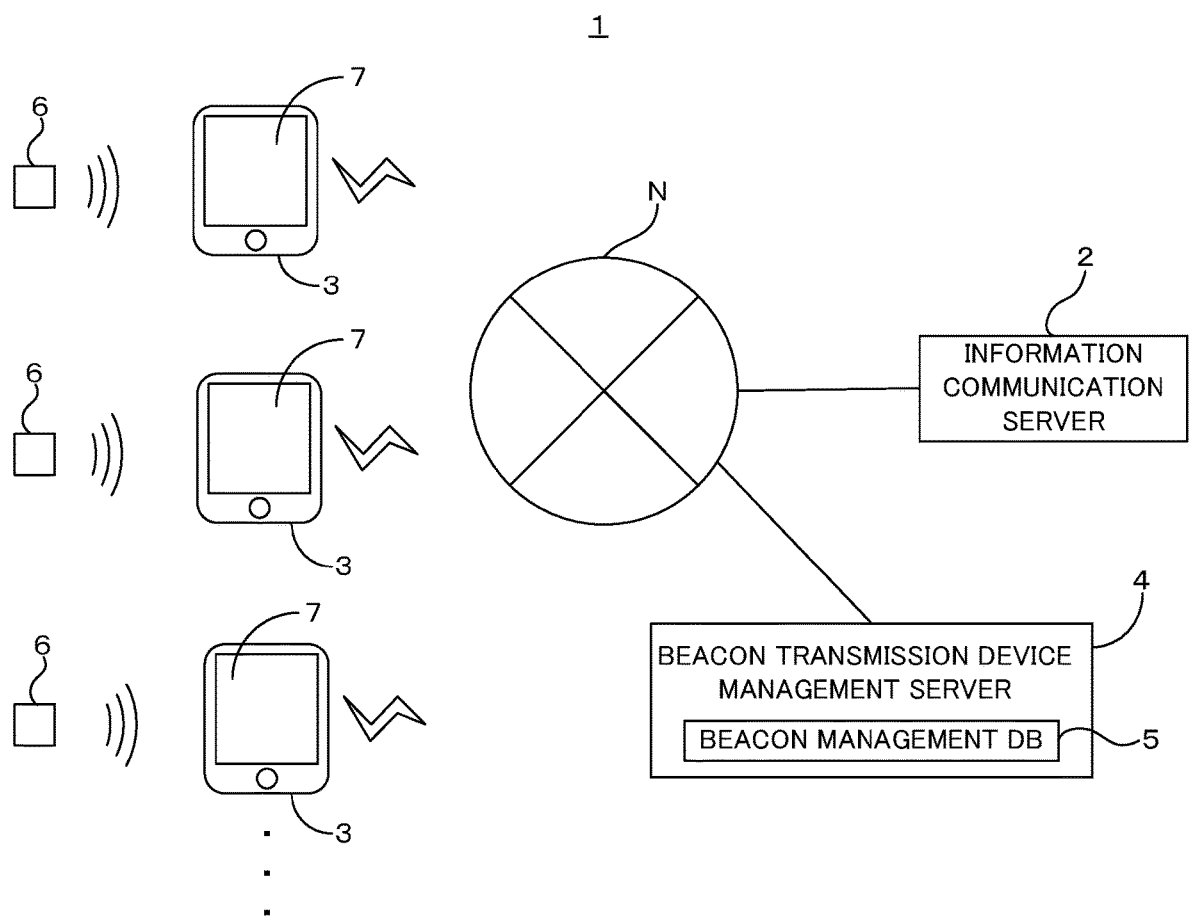
FIG. 1 is a block diagram illustrating a configuration example of a system for communicating information relating to a long period ground motion according to a first embodiment of the invention.

Hereinafter, a first embodiment of the invention will be described on the basis of the drawings. FIG. 1 is a diagram illustrating a configuration example of a system 1 for communicating information relating to a long period ground motion according to this embodiment. As illustrated in FIG. 1, the system 1 for communicating information relating to a long period ground motion includes an information communication server 2 (corresponding to a "server for communicating information relating to a long period ground motion" in the claims), and a plurality of user terminals 3 (corresponding to a "mobile terminal" in the claims). The information communication server 2 and the user terminal 3 are capable of accessing a network N including the internet, a telephone network, and other telecommunication networks, respectively. A beacon transmission device management server 4 is connected to such a network N.

The system 1 for communicating information relating to a long period ground motion is a system of which one object is to communicate useful information relevant to an earthquake (the details will be described below) to a user through the user terminal 3, on the basis of the function of the information communication server 2, the function of an application installed in the user terminal 3, and the like in a case where an earthquake occurs. In this embodiment, a predetermined business operator provides various services for the communication of the information relevant to the earthquake (hereinafter, referred to as an "information communication service") by implementing a function in the information communication server 2 or by developing or providing an application that can be installed in the user terminal 3. Hereinafter, the predetermined business operator will be referred to as a "service provider". For convenience of description, the service provider indicates an entity providing a service for descriptive purposes, may include a plurality of organizations, and may be for-profit/non-profit.

The beacon transmission device management server 4 is a server that stores a beacon transmission device-related information management database 5 (hereinafter, referred to as a "beacon management DB 5"), and responds to various inquiries, on the basis of the database. Hereinafter, information stored in the beacon management DB 5 will be described.

Here, as described below, in a case where an earthquake occurs, the system 1 for communicating information relating to a long period ground motion according to this embodiment communicates useful information relevant to the long period ground motion associated with the earthquake to the user staying at the building. Then, in this embodiment, the building to be a target for information communication in a case where the user stays at the building is a structure including a plurality of floors. A beacon transmission device 6 (FIG. 3) is installed in advance in each building. The beacon transmission device 6 is a signal transmitter that intermittently transmits a beacon signal including a beacon ID (identification information of beacon transmission device 6) at intervals. In each of the buildings, ideally, the beacon transmission device 6 is provided in a suitable position on each of the floors to be positioned in a range where a beacon signal transmitted by any beacon transmission device 6 installed on the floor on which the user stays reaches regardless which floor the user staying at the building stays on and where the user stays on the floor.

The beacon management DB 5 includes a record for each of the beacon transmission devices 6, and each record includes information relevant to the beacon transmission device 6. FIG. 2(A) is a diagram illustrating the content of one record of the beacon management DB 5. As illustrated in FIG. 2(A), one record of the beacon management DB 5 includes beacon key information, building key information, installation floor information, and beacon transmission device position information. The beacon key information included in a record of one beacon transmission device 6 is information including the beacon ID that is included in the beacon signal transmitted by the one beacon transmission device 6, as a value. In addition, the building key information included in the record of one beacon transmission device 6 is information including a building ID of a building in which the one beacon transmission device 6 is installed (identification information of the building), as a value. In addition, the installation floor information included in the record of one beacon transmission device 6 is information indicating a floor on which the one beacon transmission device 6 is installed (for example, information indicating ten floors in a case where the beacon transmission device 6 is provided on ten floors).

In addition, the beacon transmission device position information included in the record of one beacon transmission device 6 is information indicating an installation position of the one beacon transmission device 6 in a planar region on a floor of a building in which the one beacon transmission device 6 is provided. In this embodiment, the beacon transmission device position information is information indicating the position in the planar region on the floor by a combination of a latitude and a longitude. Here, the beacon transmission device position information may be information that is capable of specifying the position of the beacon transmission device 6 in the planar region on the floor of the building, and for example, a virtual coordinate system for indicating an arbitrary position in the region by coordinates is defined in advance, and the beacon transmission device position information may be information indicating the position of the beacon transmission device 6 by the coordinates of the coordinate system.

The beacon transmission device 6, for example, is installed in an automatic vending machine that is provided in each place of the building by an installation company of the automatic vending machine, a management company of the building, and the like. This is performed such that the beacon signal transmitted by the beacon transmission device 6 can be used in various services using the beacon signal transmitted by the beacon transmission device 6, including the information communication service. In this case, the beacon transmission device management server 4 is provided by the installation company or the management company described above. Note that, it is needless to say that the beacon transmission device 6 may be provided in each place of each building by a service provider, in order for the information communication service.

Figure 3:
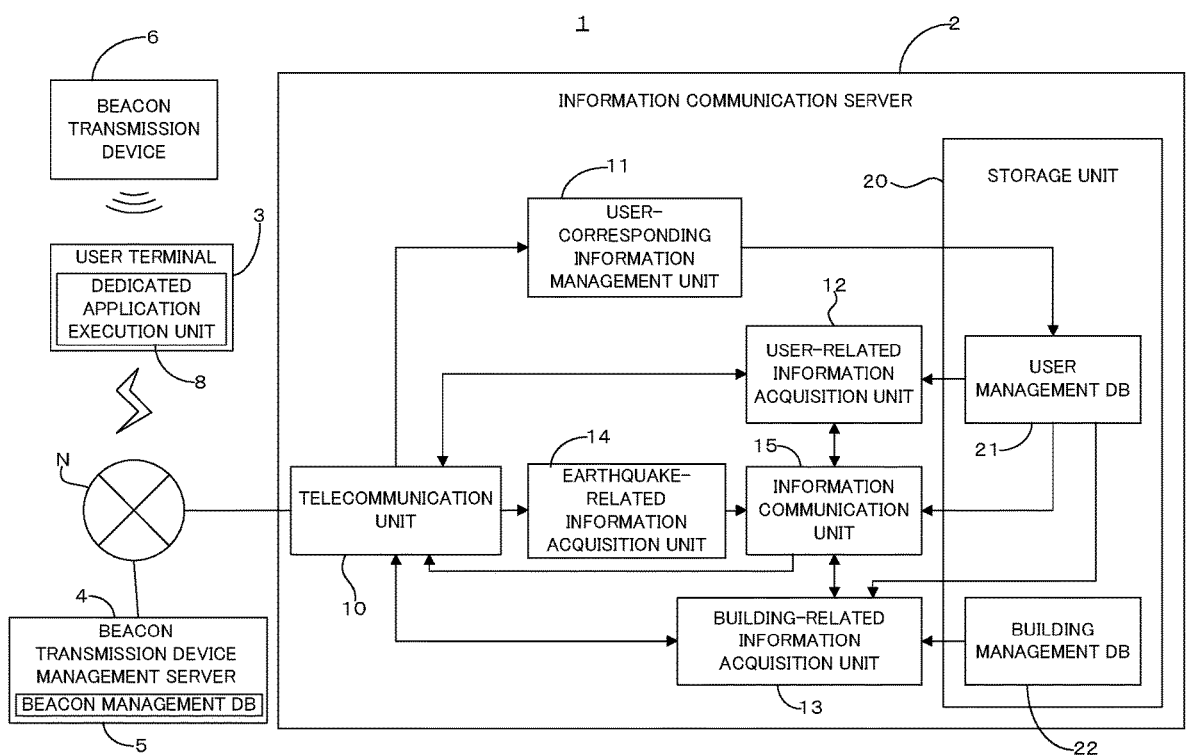
FIG. 3 is a block diagram illustrating a function configuration example of an information communication server and a user terminal according to the first embodiment of the invention.

FIG. 3 is a block diagram illustrating a function configuration example of the information communication server 2 and the user terminal 3. The user terminal 3 is a mobile type terminal that is possessed by the user, and basically, the user carries the user terminal 3 when going out. In this embodiment, the "user" indicates a person who is subjected to user registration in order to receive various services provided by the service provider. In addition, in this embodiment, the user terminal 3 is a tablet terminal in which a touch panel 7 is provided in a wide region on a front surface of a plate-shaped housing (for example, a smart phone or a tablet type computer). Here, the user terminal 3 may be a device that is capable of executing various processings described below, and for example, a note type computer or a wearable terminal (for example, a wristwatch type wearable terminal) can be used as the user terminal 3. In the user terminal 3, an application provided by the service provider (hereinafter, referred to as a "dedicated application") is installed.

In addition, the information communication server 2 is a server device that is capable of performing telecommunication with respect to the user terminal 3 and the beacon transmission device management server 4 through the network N. Note that, in FIG. 1 and FIG. 3, the information communication server 2 is illustrated by one block, which does not indicate that the information communication server 2 includes a single device. The information communication server 2 may include a plurality of devices, or may be a part of a predetermined system.

As illustrated in FIG. 3, the user terminal 3 includes a dedicated application execution unit 8, as a function configuration. In addition, the information communication server 2 includes a telecommunication unit 10, a user-corresponding information management unit 11, a user-related information acquisition unit 12, a building-related information acquisition unit 13, an earthquake-related information acquisition unit 14, and an information communication unit 15, as a function configuration. Each of the function blocks 8, and 10 to 15 described above is capable of including any of hardware, a digital signal processor (DSP), and software. For example, in the case of including software, each of the function blocks 8, and 10 to 15 described above actually includes a CPU, a RAM, a ROM, and the like of a computer, and is attained by the behavior of a program stored in a recording medium such as a RAM or a ROM, a hard disk, or a semiconductor memory. The same applies to the other blocks described below.

The dedicated application execution unit 8 of the user terminal 3 is a function block that executes various processings by hardware such as a CPU reading out a dedicated application installed in the user terminal 3 (including a part of an OS, API provided by the OS, and other accompanying programs).

As illustrated in FIG. 3, the information communication server 2 includes a storage unit 20, as storage means. The storage unit 20 includes a storage medium such as a hard disk or a magnetic tape, and stores at least a user-corresponding information management database 21 (hereinafter, referred to as a "user management DB 21") and a building-related information management database 22 (hereinafter, referred to as a "building management DB 22"). Note that, in this embodiment, the information communication server 2 itself includes the storage unit 20, but all or apart of the functions of the storage unit 20 may be provided in a device different from the device configuring the information communication server 2. For example, in this embodiment, a part or all of data stored in the storage unit 20 may be stored in an external storage device different from the device configuring the information communication server 2. In this case, the external storage device may be a device that is installed in a LAN, or may be a device that is capable of performing telecommunication with respect to the information communication server 2 through the network N.

The user management DB 21 is a database that stores information relevant to the user for each of the users. FIG. 2(B) is a diagram illustrating the contents of one record of the user management DB 21. As illustrated in FIG. 2(B), one record of the user management DB 21 includes user key information, terminal key information, push communication-related information, user property information, and nearby device information. The user key information included in a record of one user is information including a user ID applied to the one user (identification information of the user), as a value. In addition, the terminal key information included in the record of one user is information including a terminal ID of the user terminal 3 possessed by the one user (identification information of the user terminal 3), as a value. Note that, the terminal ID may be any information insofar as the information is capable of uniquely identifying the user terminal 3.

The push communication-related information is information that is used at the time of performing push communication with respect to the user terminal 3 possessed by the user, and includes device identification information issued by a push communication system, and the like. The push communication-related information included in the record of one user is information for performing push communication with respect to the user terminal 3 possessed by the one user. In this embodiment, the user allows the reception of the information relevant to the long period ground motion by the push communication.

The user property information is information relevant to the properties of the user. The user property information is information that is particularly used in a fourth embodiment, and will be described in detail in the fourth embodiment. The user property information included in the record of one user is information relevant to the properties of the one user. The nearby device information is information including the beacon ID of the beacon transmission device 6 that is assumed to be in the vicinity of the user in a case where the user stays at the building, as a value. The nearby device information will be described below. Note that, the information included in the record illustrated in FIG. 2(B) is the requisite minimum information, and may include contact information such as an address or a phone number of the user, information used for user authentication, and the like, in addition to the exemplified information.

The building management DB 22 is a database that stores information relevant to the building for each building to be managed. FIG. 2(C) is a diagram illustrating the contents of one record of the building management DB 22. As illustrated in FIG. 2(C), one record of the user management DB 21 includes building key information, building position information, building property information, and floor map information.

The building position information is information indicating the position of the building. In this embodiment, the building position information is information indicating the position of the building by the code of a section to which the building belongs. The section in this embodiment is based on sections sorted by a meteorological institute regarding an earthquake. The building position information included in a record of one building includes the code of a section to which the one building belongs, as a value. In a case where an earthquake occurs, the state of shaking on each of the floors of the building that occurs due to the long period ground motion associated with the earthquake is affected by a relationship between the hypocenter and the position of the building, and a relationship between the earthquake and the building derived from the position of the other building.

The building property information is information relevant to the properties of the building, and is information that is used at the time of calculating the state of the shaking that occurs due to the long period ground motion on each of the floors of the building. In detail, it is widely known that when an earthquake occurs, the long period ground motion that is an earthquake motion having a long cycle may occur. As is well known, in a tall building such as a high-rise apartment or a high building, a unique cycle thereof easily resonates with the cycle of an earthquake wave of a long period ground motion, and in a case where a long period ground motion occurs, the building tends to shake significantly.

As a result of the recent study, it is found that in a case where the building shakes by the long period ground motion, the shaking occurs in different states on each of the floors of the building. The state of the shaking indicates the size of the shaking on each of the floors, an oscillation cycle, an attenuation state of the shaking, and the like. In addition, it is found that the state of the shaking on each of the floors of the building is affected by the properties of the building such as the number of aboveground floors of the building (the total number of floors), the height of the building (a height from a ground surface or a spot corresponding to the ground surface), a building structure of the building, and the state of the ground on which the building is built, in addition to the contents of the earthquake that occurs (a hypocenter, an earthquake intensity, a response spectrum of the earthquake wave, and the like). Note that, the building structure indicates a structure system sorted by an architectural material to be used, such as an S structure, a RC structure, and a SRC structure.

In this embodiment, as described below, the information communication unit 15 calculates a shaking level (as described below, the degree of shaking) of a specific floor (a floor indicated by the installation floor information) by Computational Expression S1 including information relating to an earthquake that occurs, the installation floor information, the building position information, and the building property information as input. Then, the building property information is information relevant to the properties of the building to be reflected in order to suitably calculate the shaking level, and sufficiently includes the information to be input into Computational Expression S1. In particular, in this embodiment, the building property information includes information that is at least relevant to a study result in which the number of aboveground floors of the building (the total number of floors), the height of the building, the building structure of the building, and the state of the ground on which the building is built are affected by the state of the shaking on each of the floors of the building. Here, this is merely an example, and for example, in a case where elements relevant to the building that can be effectively used in the calculation of the shaking on each of the floors of the building are found in the future study, the building property information may include information relevant to the elements.

The floor map information includes image data in which a floor map on each of the floors of the building (a map of the floor seen from the top) is recorded. Hereinafter, image data of a floor map of the N-th floor will be referred to as N-th floor map data. In a case where an evacuation gate or an evacuation space is provided on the floor, the evacuation gate or the evacuation space is clearly specified on the floor map, and in a case where there is an evacuation route recommended to go through when an earthquake occurs, information indicating the evacuation route is recorded. In addition, a relationship between the longitude and the latitude is suitably defined on the floor map, and an arbitrary position on the map representing the floor can be represented by the latitude and the longitude.

Then, the user-corresponding information management unit 11 of the information communication server 2 manages the user management DB 21 that is stored in the storage unit 20. In detail, in a case where a certain user is subjected to user registration, the user-corresponding information management unit 11 generates the record of the user by collecting the necessary information, and registers the record in the user management DB 21. In addition, the user-corresponding information management unit 11 suitably performs changes the contents of the information included in the record to delete the record according to a withdrawal.

Further, the user-corresponding information management unit 11 suitably updates the contents of the nearby device information of each of the records in the user management DB 21. Hereinafter, the processing of the user-corresponding information management unit 11 at the time of updating the contents of the nearby device information of the certain user will be described in detail. In the following description of the processing of the user-corresponding information management unit 11, the user to be a processing target will be referred to as a "target user".

As described above, the beacon transmission device 6 is installed in the building that is managed by the building management DB 22. In a case where the target user enters the building and is positioned in a range where a beacon signal transmitted by a certain beacon transmission device 6 reaches, the user terminal 3 possessed by the target user receives the beacon signal, in accordance with a predetermined wireless telecommunication standard such as Bluetooth (Registered Trademark). Note that, in a case where there is a measure to be performed in advance in order to receive the beacon signal (for example, a measure for making Bluetooth effective) such as setting a state in which an electric wave of the predetermined wireless telecommunication standard can be sensed, in order to enjoy the information communication service, a necessity for performing such a measure in advance is suitably conveyed to the user.

In a case where the user terminal 3 receives the beacon signal, the beacon ID included in the beacon signal is communicated to the dedicated application execution unit 8 by the function of a predetermined program of the user terminal 3. Note that, in a case where a dedicated application is not activated, the dedicated application is activated by the function of the predetermined program, and then, the beacon ID is communicated to the dedicated application execution unit 8. In a case where the beacon ID is communicated to the dedicated application execution unit 8, the dedicated application execution unit 8 transmits a beacon communication command including the terminal ID and the beacon ID to the information communication server 2. Note that, in a case where the beacon signals are simultaneously received from a plurality of beacon transmission devices 6, the dedicated application execution unit 8 transmits the beacon communication command based on one beacon ID by the existing processing using receiving intensity or predetermined information included in the beacon signal. In the dedicated application, information necessary for performing telecommunication with respect to the information communication server 2 (the address of an access destination, a port number, information necessary for user authentication, and the like) is registered.

The user-corresponding information management unit 11 receives the beacon communication command that is transmitted by the user terminal 3 of the target user. Next, the user-corresponding information management unit 11 specifies the record corresponding to the terminal ID included in the beacon communication command, with reference to the user management DB 21. Then, the user-corresponding information management unit 11 updates the value of the nearby device information of the specified record by the beacon ID included in the received beacon communication command. As a result thereof, the value of the nearby device information becomes the beacon ID of the beacon transmission device 6 in a position closest to the target user at the current time, in the beacon transmission devices 6 installed on the floors on which the target user stays.

As described above, the beacon transmission device 6 is provided in each place of the building, and the beacon transmission device 6 that is a transmission destination of the beacon signal received by the user terminal 3 is also changed in association with the movement of the target user in the building. The transmission of the beacon communication command by the dedicated application execution unit 8, and the update of the contents of the nearby device information based on the beacon communication command by the user-corresponding information management unit 11 are executed whenever the beacon communication command is received by the user terminal 3, and thus, the value of the nearby device information is suitably updated in accordance with the movement of the target user. In addition, in a case where a certain period of time has elapsed since the beacon communication command is finally received from the target user, the user-corresponding information management unit 11 sets the value of the nearby device information of the target user to a null value. In a case where a certain period of time has elapsed, it is assumed that the target user exits from the building.

The user-related information acquisition unit 12 acquires the push communication-related information, the installation floor information, and the beacon transmission device position information of the user having a specific user ID to output the information the information communication unit 15, in accordance with a request of the information communication unit 15. The installation floor information acquired by the user-related information acquisition unit 12 corresponds to "information indicating a floor on which the user stays in a building at which the user stays" in the claims, and the beacon transmission device position information corresponds to "information indicating a position of the user in a planar region on the floor of the building at which the user stays" in the claims. Hereinafter, the processing of the user-related information acquisition unit 12 will be described in detail.

As described below, in a predetermined case, the information communication unit 15 designates the user ID and requests the acquisition of the push communication-related information, the installation floor information, and the beacon transmission device position information of the user having the designated user ID, with respect to the user-related information acquisition unit 12. The user-related information acquisition unit 12 specifies the record corresponding to the designated user ID in the records, in accordance with the request, with reference to the user management DB 21 stored in the storage unit 20. Next, the user-related information acquisition unit 12 acquires the push communication-related information and the nearby device information that are included in the specified record.

Next, the user-related information acquisition unit 12 transmits a user-related information response request command that includes the acquired nearby device information and requests the response of the installation floor information and the beacon transmission device position information to the beacon transmission device management server 4. The value of the nearby device information included in the user-related information response request command is a beacon ID included in the beacon signal that is transmitted by the beacon transmission device 6 existing in the vicinity of the user having the designated user ID.

The beacon transmission device management server 4 receives the user-related information response request command. Next, the beacon transmission device management server 4 acquires the nearby device information included in the received user-related information response request command, and specifies a record including the beacon key information of which the value is identical to that of the acquired nearby device information, in the records of the beacon management DB 5. Next, the beacon transmission device management server 4 acquires the installation floor information and the beacon transmission device position information that are included in the specified record. Next, the beacon transmission device management server 4 responds to the user-related information acquisition unit 12 with the installation floor information and the beacon transmission device position information that are acquired.

The user-related information acquisition unit 12 receives and acquires the installation floor information and the beacon transmission device position information. Next, the user-related information acquisition unit 12 outputs the installation floor information and the beacon transmission device position information that are acquired to the information communication unit 15, along with the push communication-related information. Note that, the floor indicated by the installation floor information can be regarded as the floor on which the user having the designated user ID stays in the building. In addition, the position indicated by the beacon transmission device position information can be regarded as the position of the user having the designated user ID in the planar region on the floor of the building.

The building-related information acquisition unit 13 acquires the building position information, the building property information, and the floor map data (described below) of the user having the specific user ID, in accordance with the request of the information communication unit 15, and outputs the information and the data to the information communication unit 15. The building position information and the building property information that are acquired by the building-related information acquisition unit 13 correspond to "information that is relevant to a position and a structure of the building at which the user stays and is used at the time of calculating a state of shaking that occurs due to the long period ground motion on each of the floors of the building" in the claims. Hereinafter, the processing of the building-related information acquisition unit 13 will be described in detail. In the following description, the building position information, the building property information, and the floor map data will be collectively referred to as "building-related information".

As described below, in a predetermined case, the information communication unit 15 designates the user ID and the installation floor information and requests the acquisition of the building-related information of the user having the designated user ID, with respect to the building-related information acquisition unit 13. The building-related information acquisition unit 13 specifies the record corresponding to the designated user ID in the records, in accordance with the request, with reference to the user management DB 21 stored in the storage unit 20. Next, the building-related information acquisition unit 13 acquires the nearby device information included in the specified record.

Next, the building-related information acquisition unit 13 transmits the building ID response request command that includes the acquired nearby device information and requests the response of the building ID to the beacon transmission device management server 4. The beacon transmission device management server 4 receives a building ID response request command. Next, the beacon transmission device management server 4 acquires the nearby device information included in the received building ID response request command, specifies a record including the beacon key information of which the value is identical to that of the acquired nearby device information, in the records of the beacon management DB 5. Next, the beacon transmission device management server 4 acquires the building key information included in the specified record. Next, the beacon transmission device management server 4 responds to the building-related information acquisition unit 13 with the acquired building key information. Here, the building key information that has responded to the building-related information acquisition unit 13 includes the building ID of the building at which the user corresponding to the designated user ID stays at the current time as a value.

The building-related information acquisition unit 13 receives and acquires the building key information. Next, the building-related information acquisition unit 13 specifies the record corresponding to the acquired building key information, in the records of the building management DB stored in the storage unit 20. Next, the building-related information acquisition unit 13 acquires the building-related information included in the specified record (the building position information, the building property information, and the floor map data). Note that, the building-related information acquisition unit 13 acquires the data corresponding to the floor indicated by the designated installation floor information from the information communication unit 15, in the first floor map data to the N-th floor map data included in the record, as the floor map data. That is, the floor map data is the image data in which the floor map of the floor on which the user stays is recorded. The building-related information acquisition unit 13 outputs the acquired building-related information to the information communication unit 15.

In a case where an earthquake occurs, the earthquake-related information acquisition unit 14 acquires the information relating to an earthquake that occurs through the network N. In detail, in a case where an earthquake occurs, the information relevant to the earthquake that occurs and the information relevant to the long period ground motion associated with the earthquake that occurs are provided by a meteorological institute and other organizations (hereinafter, referred to as a "meteorological institute and the like"). The information relevant to the earthquake that occurs is an occurrence clock time of the earthquake, the hypocenter, the maximum predicted earthquake intensity, a main motion (S-wave) arrival clock time with respect to each spot, and the like, and the information relevant to the long period ground motion is a response spectrum and the like. The earthquake-related information acquisition unit 14 acquires information that is used at the time of calculating the state of the shaking that occurs due to the long period ground motion on each of the floors of the building and is used as a variable in Computational Expression S1 described below, as the information relating to an earthquake that occurs, in the information that is provided by the meteorological institute and the like through the network N. The earthquake-related information acquisition unit 14 outputs the acquired information relating to an earthquake that occurs to the information communication unit 15. The acquisition of the information by the earthquake-related information acquisition unit 14 and the output of the information with respect to the information communication unit 15 are promptly executed in a case where an earthquake occurs.

In a case where the information relating to an earthquake that occurs is input from the earthquake-related information acquisition unit 14 (=in a case where an earthquake occurs), the information communication unit 15 executes the following processing. Hereinafter, the processing of the information communication unit 15 will be described in detail.

In a case where the information relating to an earthquake that occurs is input from the earthquake-related information acquisition unit 14, the information communication unit 15 specifies a record in which the nearby device information is not a null value, in the records of the user management DB 21, with reference to the user management DB 21 stored in the storage unit 20, and prepares a list of the user IDs, on the basis of the user key information of each of the specified records. The user ID recorded in the list is the user ID of the user who is assumed to stay at the building. Next, the information communication unit 15 executes the following processing for each of the user IDs recorded in the list. Hereinafter, the processing that is executed with respect to the user having a certain user ID recorded in the list by the information communication unit 15 will be described in detail. In the following description of the processing of the information communication unit 15, the user as the state of the processing will be referred to as the "target user", and the user ID of the target user will be referred to as a "target user ID".

The information communication unit 15 designates the target user ID and requests the acquisition of the push communication-related information, the installation floor information, and the beacon transmission device position information of the target user, with respect to the user-related information acquisition unit 12. The information communication unit 15 inputs the push communication-related information, the installation floor information, and the beacon transmission device position information that are output by the user-related information acquisition unit 12, in accordance with the request. Further, the information communication unit 15 designates the target user ID and the installation floor information and requests the acquisition of the building position information, the building property information, and the floor map data of the target user, with respect to the building-related information acquisition unit 13. The information communication unit 15 inputs the building position information, the building property information, and the floor map data that are output by the building-related information acquisition unit 13, in accordance with the request.

Next, the information communication unit 15 inputs the information relating to an earthquake that occurs that is input from the earthquake-related information acquisition unit 14, the installation floor information that is input from the user-related information acquisition unit 12, and the building position information and the building property information that are input from the building-related information acquisition unit 13 to Computational Expression S1, and calculates the shaking level of the floor indicated by the installation floor information (=the floor of the building on which the target user stays). Computational Expression S1 is a computational expression for calculating the shaking level that occurs on a specific floor of the building due to the long period ground motion associated with the earthquake that occurs by reflecting the position and the structure of the building, and the state of the earthquake that occurs. It is not necessary that Computational Expression S1 is a single expression, and Computational Expression S1 may include a combination of a plurality of expressions. The shaking level represents the degree of shaking as a level in a predetermined range, and as an example, the degree of shaking is represented by any level in levels 1 to 4 in which the degree gradually increases.

Further, the information communication unit 15 inputs the information relating to an earthquake that occurs, the building position information, and building specification information to Computational Expression S2, and calculates a time required for occurrence that is a time required until the shaking due to the long period ground motion occurs in the building at which the user stays. Computational Expression S2 is a computational expression for calculating the time required for occurrence by reflecting the position and the structure of the building, and the state of the earthquake that occurs.

After the shaking level and the time required for occurrence are calculated, the information communication unit 15 generates message data that is used in the display of a message M1 (FIG. 4(A)) by push communication, on the basis of the calculated shaking level and the calculated time required for occurrence. Further, the information communication unit 15 generates drawing data that is used in the display of an information communication screen G1 (FIG. 4(B)), on the basis of the beacon transmission device position information and the floor map data, in addition to the calculated shaking level and the calculated time required for occurrence. The information communication unit 15 stores the generated drawing data in a predetermined storage region, in association with the target user ID.

Next, the information communication unit 15 transmits the message data to a predetermined push communication system, on the basis of the push communication-related information, and performs push communication with respect to the user terminal 3 possessed by the target user. The user terminal 3 of the target user displays the message M1, in accordance with the push communication. Note that, according to the setting of the user, a warning tone may be produced, or the housing may oscillate, in accordance with the push communication.

FIG. 4(A) is a diagram illustrating an example of the message M1 that is displayed on a lock screen displayed on the touch panel 7 of the user terminal 3, in accordance with the push communication. As illustrated in FIG. 4(A), in the message M1, the shaking level of the shaking on the floor of the building at which the target user stays that occurs due to the long period ground motion, and the time required until the shaking occurs (the time required for occurrence) are clearly specified. For this reason, the target user visually recognizes the message M1, and thus, is capable of accurately recognizing the size of shaking and the remaining time until the shaking occurs, in addition to whether or not the shaking due to the long period ground motion occurs in the position in which the user stays.

When the message M1 is touched, the dedicated application is activated in a case where the dedicated application is not activated. The dedicated application execution unit 8 communicates the user ID (=the user ID of the target user) and requests the transmission of the drawing data, with respect to the information communication unit 15 of the information communication server 2, in accordance with the touch operation with respect to the message M1. The information communication unit 15 responds the dedicated application execution unit 8 with the drawing data stored in the predetermined storage region in association with the user ID, in accordance with the request. The dedicated application execution unit 8 receives the drawing data, and displays the information communication screen G1 on the touch panel 7, on the basis of the drawing data.

FIG. 4(B) is a diagram illustrating an example of the information communication screen G1. As illustrated in FIG. 4(B), the shaking level and the time required for occurrence are displayed on the information communication screen G1. Further, the floor map of the floor on which the target user stays is displayed on the information communication screen G1, in a state where the position of the user on the floor (accurately, the position of the beacon transmission device 6 that is closest to the user) is clearly specified. As described above, information relevant to an evacuation such as the evacuation gate, the evacuation space, and the evacuation route is recorded in the floor map. Accordingly, the target user visually recognizes the floor map, and thus, is capable of recognizing a positional relationship between the own position and the position of the evacuation gate or the evacuation space, the movement in the case of evacuating through the evacuation route, and the like. For this reason, in a case where the target user determines to evacuate, on the basis of the shaking level and the time required for occurrence, the target user is capable of smoothly evacuating by a suitable method, on the basis of the recognition.

As described above, in this embodiment, in a case where an earthquake occurs, the necessary information is collected, and then, the shaking level (the state of the shaking) that occurs on the floor of the building at which the user stays due to the long period ground motion is suitably calculated. After that, the information indicating the shaking level (information according to the state of the shaking) is communicated to the user through the user terminal 3 possessed by the user. For this reason, the user is capable of promptly receiving the information through a user terminal 3 that the user has, and of explicitly grasping the contents of the information. That is, according to this embodiment, the information relevant to the long period ground motion can be accurately conveyed to the person staying on each of the floors of the building.

Figure 5:
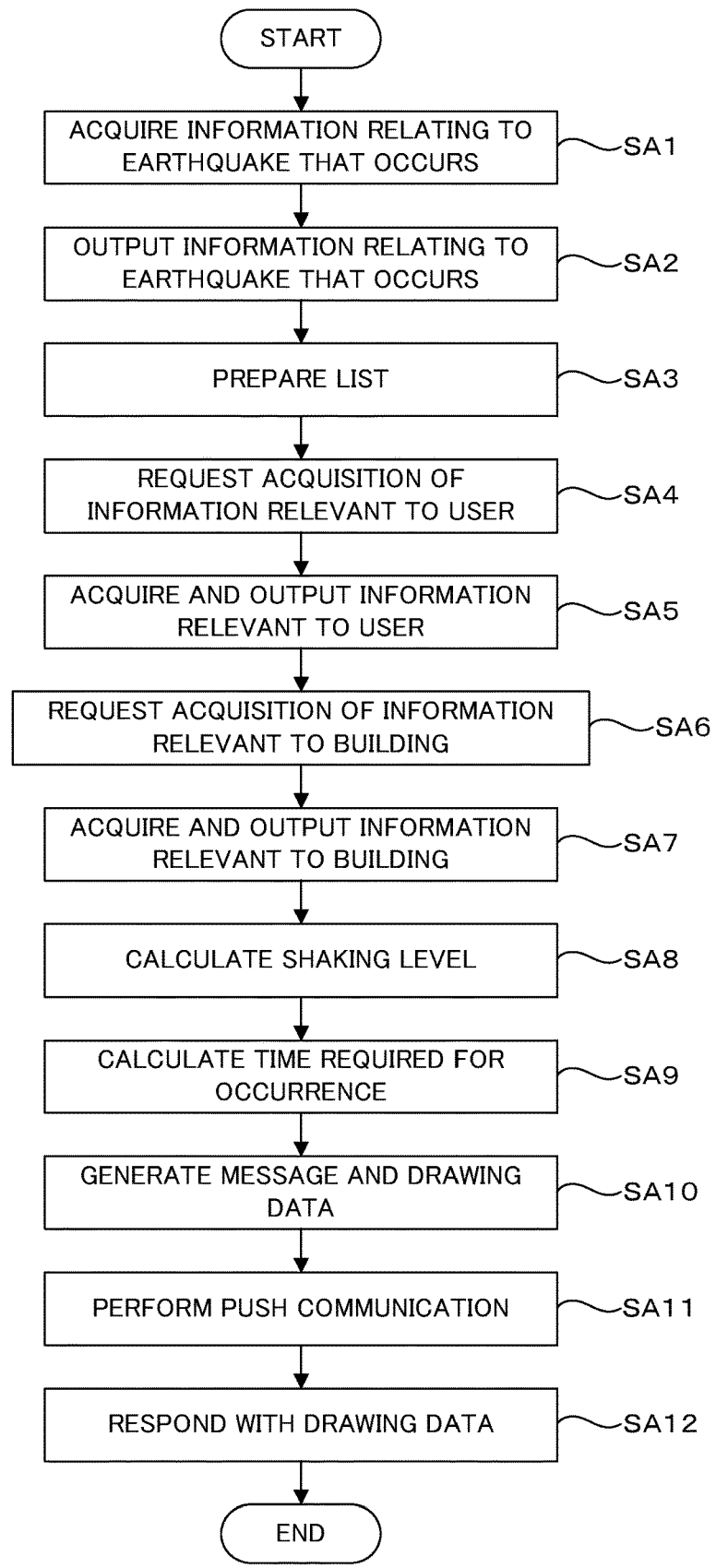
FIG. 5 is a flowchart illustrating a behavior of the information communication server.

Next, a behavior example of the information communication server 2 in a case where an earthquake occurs will be described by using a flowchart in FIG. 5. As illustrated in FIG. 5, in a case where an earthquake occurs, the earthquake-related information acquisition unit 14 acquires the information relating to an earthquake that occurs, on the basis of the information that is provided by the meteorological institute and the like (step SA1). The earthquake-related information acquisition unit 14 outputs the acquired information relating to an earthquake that occurs to the information communication unit 15 (step SA2). In a case where the information relating to an earthquake that occurs is input, the information communication unit 15 prepares the list of the user IDs to be subjected to the push communication, on the basis of the record in which the nearby device information is not a null value, with reference to the user management DB 21 (step SA3). The processing after step SA4 is processing that is performed with respect to one user ID in the user IDs recorded in the list by the information communication server 2.

The information communication unit 15 designates the user ID and requests the acquisition of the push communication-related information, the installation floor information, and the beacon transmission device position information, with respect to the user-related information acquisition unit 12 (step SA4). The user-related information acquisition unit 12 acquires the push communication-related information, the installation floor information, and the beacon transmission device position information, in accordance with the request of step SA4, and outputs the information to the information communication unit 15 (step SA5). Next, the information communication unit 15 designates the user ID and requests the acquisition of the building position information, the building property information, and the floor map data, with respect to the building-related information acquisition unit 13 (step SA6). The building-related information acquisition unit 13 acquires the building position information, the building property information, and the floor map data, in accordance with the request of step SA6, and outputs the information to the information communication unit 15 (step SA7).

Note that, in this embodiment, the acquisition of the information by the earthquake-related information acquisition unit 14, the acquisition of the information by the user-related information acquisition unit 12, and the acquisition of the information by the building-related information acquisition unit 13 are performed in this order. However, insofar as each of the information items is suitably acquired by each function block, the processing order is not limited to the order exemplified in this embodiment.

The information communication unit 15 inputs the information relating to an earthquake that occurs, the installation floor information, the building position information, and the building property information to Computational Expression S1, and calculates the shaking level of the floor on which the user stays (step SA8). Further, the information communication unit 15 inputs the information relating to an earthquake that occurs, the building position information, and the building specification information to Computational Expression S2, and calculates the time required for occurrence (step SA9). Next, the information communication unit 15 generates the message data for displaying the message M1 and generates the drawing data for displaying the information communication screen G1, on the basis of the calculated shaking level and the calculated time required for occurrence and on the basis of various information items (step SA10). The information communication unit 15 stores the drawing data in the predetermined storage region, in association with the user ID.

Next, the information communication unit 15 performs the push communication with respect to the user terminal 3, on the basis of the generated message data (step SA11). As described by using FIG. 4(A), the message M1 is displayed on the touch panel 7 of the user terminal 3 by the push communication. Further, the information communication unit 15 responds to the user terminal 3 with the generated drawing data, in accordance with the request from the dedicated application execution unit 8 (step SA12). As described by using FIG. 4(B), the information communication screen G1 is displayed on the touch panel 7 of the user terminal 3 by the response of the drawing data.

Second Embodiment

Figure 6:
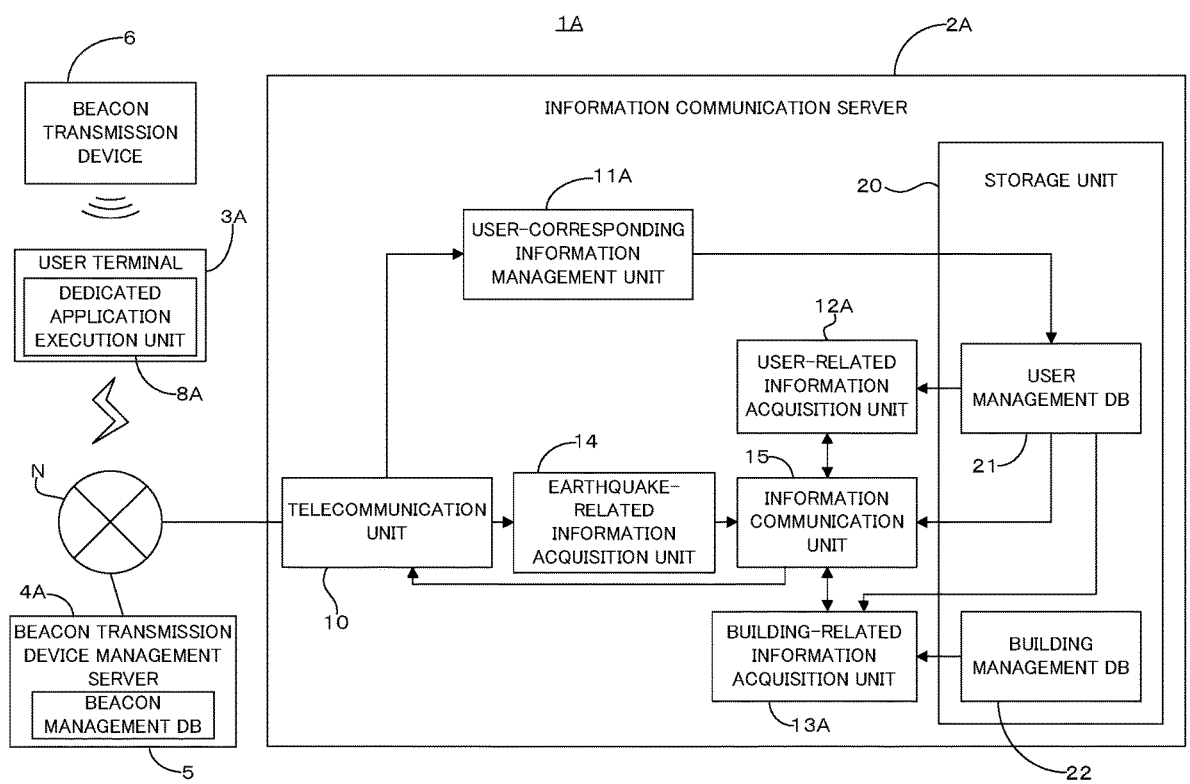
FIG. 6 is a block diagram illustrating a function configuration example of an information communication server and a user terminal according to a second embodiment of the invention.

Next, a second embodiment will be described. FIG. 6 is a block diagram illustrating a functional configuration of a user terminal 3A and an information communication server 2A of a system 1A for communicating information relating to a long period ground motion according to the second embodiment. As it is obvious from the comparison between FIG. 3 and FIG. 6, the user terminal 3A includes a dedicated application execution unit 8A instead of the dedicated application execution unit 8. In addition, the information communication server 2A includes a user-corresponding information management unit 11A instead of the user-corresponding information management unit 11, includes a user-related information acquisition unit 12A instead of the user-related information acquisition unit 12, and includes a building-related information acquisition unit 13A instead of the building-related information acquisition unit 13. In addition, in the storage unit 20, a user management DB 21A is stored instead of the user management DB 21. In addition, a beacon transmission device management server 4A is connected to the network N instead of the beacon transmission device management server 4. In the second embodiment, the same reference numerals will be applied to the same elements as those of the first embodiment, and the detailed description thereof will be omitted.

In the first embodiment described above, the dedicated application execution unit 8 of the user terminal 3 transmits the beacon communication command to the information communication server 2, in accordance with the reception of the beacon signal. On the other hand, in this embodiment, the dedicated application execution unit 8A of the user terminal 3A transmits the beacon communication command to the beacon transmission device management server 4A, in accordance with the reception of the beacon signal.

In a case where the beacon communication command is received, the beacon transmission device management server 4A specifies a record in which the value of the beacon key information is identical to the value of the beacon ID included in the beacon communication command, in the beacon management DB 5. Next, the beacon transmission device management server 4A acquires the building key information, the installation floor information, and the beacon transmission device position information of the specified record. Next, the beacon transmission device management server 4A transmits current position-related information that includes the terminal ID included in the beacon communication command and includes the building key information, the installation floor information, and the beacon transmission device position information that are acquired to the information communication server 2A.

The user-corresponding information management unit 11A of the information communication server 2A receives the current position-related information. Next, the user-corresponding information management unit 11A accesses the user management DB 21A. FIG. 2(D) is a diagram schematically illustrating the contents of one record of the user management DB 21A. As it is obvious from the comparison between FIG. 2(D) and FIG. 2(B), in this embodiment, the nearby device information is not included in the record, but the building key information, the installation floor information, and the beacon transmission device position information are included in the record. The user-corresponding information management unit 11 specifies the corresponding record, on the basis of the terminal ID included in the received current position-related information, and updates the value of the building key information, the installation floor information, and the beacon transmission device position information of the specified record by the value of the building key information, the installation floor information, and the beacon transmission device position information that are included in the current position-related information.

In addition, in this embodiment, the user-related information acquisition unit 12A acquires the installation floor information and the beacon transmission device position information by the following method, in accordance with the request of the information communication unit 15. That is, the user-related information acquisition unit 12A specifies a record corresponding to the user ID that is designated by the information communication unit 15, in the records of the user management DB 21A. Next, the user-related information acquisition unit 12A acquires the installation floor information and the beacon transmission device position information that are included in the specified record, and outputs the information to the information communication unit 15.

In addition, in this embodiment, the building-related information acquisition unit 13A acquires the building position information, the building property information, and the floor map data by the following method, in accordance with the request of the information communication unit 15. That is, the building-related information acquisition unit 13A specifies a record corresponding to the user ID that is designated by the information communication unit 15, in the records of the user management DB 21A. Next, the building-related information acquisition unit 13A acquires the building key information that is included in the specified record. Next, the building-related information acquisition unit 13A specifies a record corresponding to the acquired building key information, in the building management DB 22, and acquires the building position information, the building property information, and the floor map data that are included in the specified record. The building-related information acquisition unit 13A outputs each of the acquired information items to the information communication unit 15.

As with the first embodiment, in the configuration of the this embodiment, the information considering the influence of the long period ground motion on the shaking on the floor of the building at which the user stays can be accurately conveyed to the user staying at the building. In particular, according to the second embodiment, it is not necessary that the user-related information acquisition unit 12A and the building-related information acquisition unit 13A access the network N at the time of acquiring the information (in a case where the storage unit 20 is an external storage device connected to the network N), and thus, a processing efficiency is improved.

Third Embodiment

Figure 7:
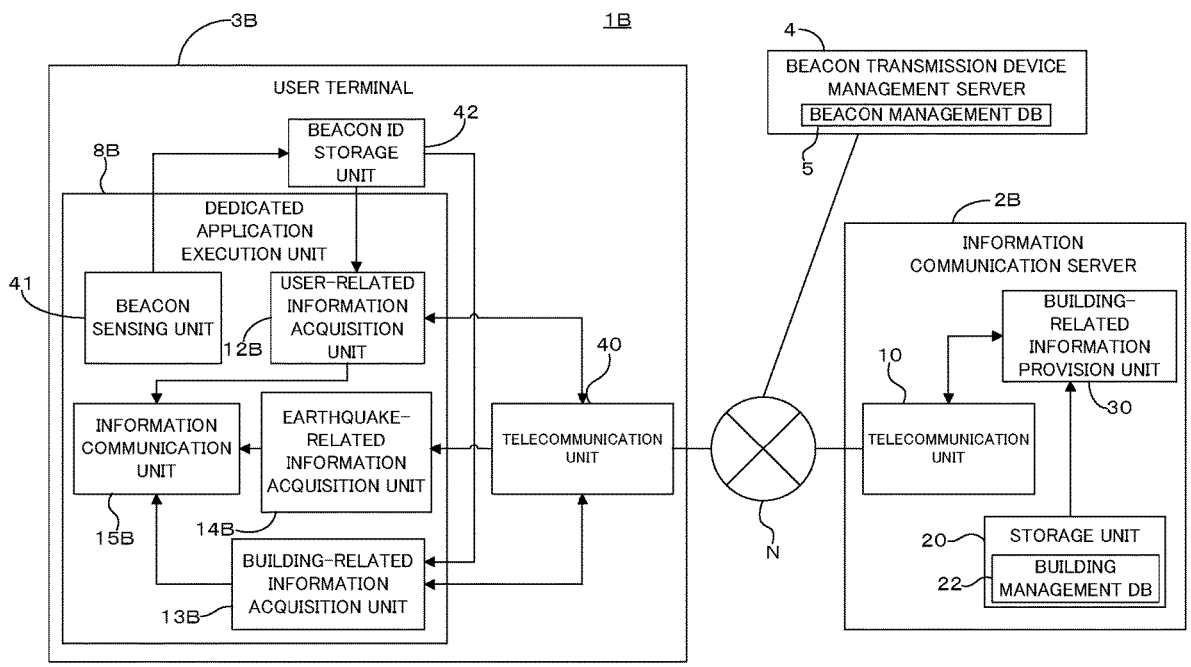
FIG. 7 is a block diagram illustrating a function configuration example of an information communication server and a user terminal according to a third embodiment of the invention.

Next, a third embodiment will be described. FIG. 7 is a block diagram illustrating a functional configuration of a user terminal 3B and an information communication server 2B of a system 1B for communicating information relating to a long period ground motion according to the third embodiment. In the third embodiment, the same reference numerals will be applied to the same elements as those of the first embodiment, and the detailed description thereof will be omitted.

As illustrated in FIG. 7, the information communication server 2B includes a building-related information provision unit 30. In addition, in the storage unit 20, the user management DB 21 is not stored, but the building management DB 22 is stored. In addition, the user terminal 3B includes a dedicated application execution unit 8B executing various processings by the function of the dedicated application, in addition to a telecommunication unit 40 controlling telecommunication through the network N. The dedicated application execution unit 8B includes a beacon sensing unit 41, a user-related information acquisition unit 12B, a building-related information acquisition unit 13B, an earthquake-related information acquisition unit 14B, and an information communication unit 15B. In addition, the user terminal 3B includes a beacon ID storage unit 42, as storage means.

In the first embodiment described above, a function of acquiring information necessary for calculating the shaking level and the time required for occurrence, and a function of calculating the shaking level and the time required for occurrence are provided in the information communication server 2. On the other hand, in this embodiment, such functions are provided in the user terminal 3B, and in a case where an earthquake occurs, the user terminal 3B executes the collection of the necessary information, the calculation of the shaking level and the time required for occurrence, and communication with respect to the user. Hereinafter, the behavior of each device of the system. 1B for communicating information relating to a long period ground motion in a case where an earthquake occurs will be described.

In a case where an earthquake occurs, in accordance with the distribution of an earthquake alert by the meteorological institute and the like, the earthquake alert is distributed to the mobile terminal by an electric telecommunication business operator. In the user terminal 3, in a case where the dedicated application is not activated when the earthquake alert is distributed, the dedicated application is activated by the function of the API provided by the OS, and the other programs.

The beacon sensing unit 41 controls a telecommunication module that is implemented in the user terminal 3, in accordance with the distribution of the earthquake alert, and monitors whether or not the beacon signal is received during a predetermined period exceeding an interval at which the beacon transmission device 6 transmits the beacon signal. In a case where the beacon signal is not received, it is assumed that the user does not stay at the building, and thus, the communication of the information relevant to the long period ground motion described below is not performed. On the other hand, in a case where the beacon signal is received, it is assumed that the user stays at the building, and the beacon sensing unit 41 acquires and stores the beacon ID included in the received beacon signal, in the beacon ID storage unit 42.

The earthquake-related information acquisition unit 14B acquires the information relating to an earthquake that occurs that is provided from the meteorological institute and the like through the network N, and outputs the information to the information communication unit 15B.

The user-related information acquisition unit 12B requests the transmission of the installation floor information and the beacon transmission device position information with respect to the beacon transmission device management server 4 by using the beacon ID stored in the beacon ID storage unit 42 as a key, in accordance with the request of the information communication unit 15B, and acquires the information. A procedure performed between the user-related information acquisition unit 12B and the beacon transmission device management server 4 is identical to that of the first embodiment, and thus, the details thereof will be omitted. The user-related information acquisition unit 12B outputs the acquired information to the information communication unit 15B.

The building-related information acquisition unit 13B acquires the building ID and the installation floor information from the beacon transmission device management server 4 by using the beacon ID stored in the beacon ID storage unit 42 as a key, in accordance with the request of the information communication unit 15B. Next, the building-related information acquisition unit 13B designates the building ID and the installation floor information that are acquired, and requests the transmission of the building position information, the building property information, and the floor map data, with respect to the building-related information provision unit 30 of the information communication server 2B. The building-related information provision unit 30 acquires the information from the building management DB 22 by the same method as that of the building-related information acquisition unit 13 of the first embodiment, in accordance with the request, and performs response with the information. The building-related information acquisition unit 13B acquires the information subjected to the response, and outputs the information to the information communication unit 15B.

The information communication unit 15B calculates the shaking level and necessary time information by using Computational Expression S1 and Computational Expression S2, on the basis of the information input from each of the earthquake-related information acquisition unit 14B, the user-related information acquisition unit 12B, and the building-related information acquisition unit 13B. Next, the information communication unit 15B generates the drawing data for displaying the information communication screen G1, on the basis of a calculation result and various information items, and displays the information communication screen G1 on the touch panel, on the basis of the drawing data.

As with the first embodiment, suitable information considering the influence of the long period ground motion on the shaking on the floor of the building at which the user stays can be conveyed to the user staying at the building by the method of this embodiment. Further, according to this embodiment, it is possible to reduce a risk that the communication of the information relating to the long period ground motion is delayed or is not capable of being performed due to the problem of the server or the network.

Note that, in this embodiment, the information communication server 2B includes the building management DB 22, but the user terminal 3B may store data corresponding to the building management DB 22.

Fourth Embodiment

Figure 8:
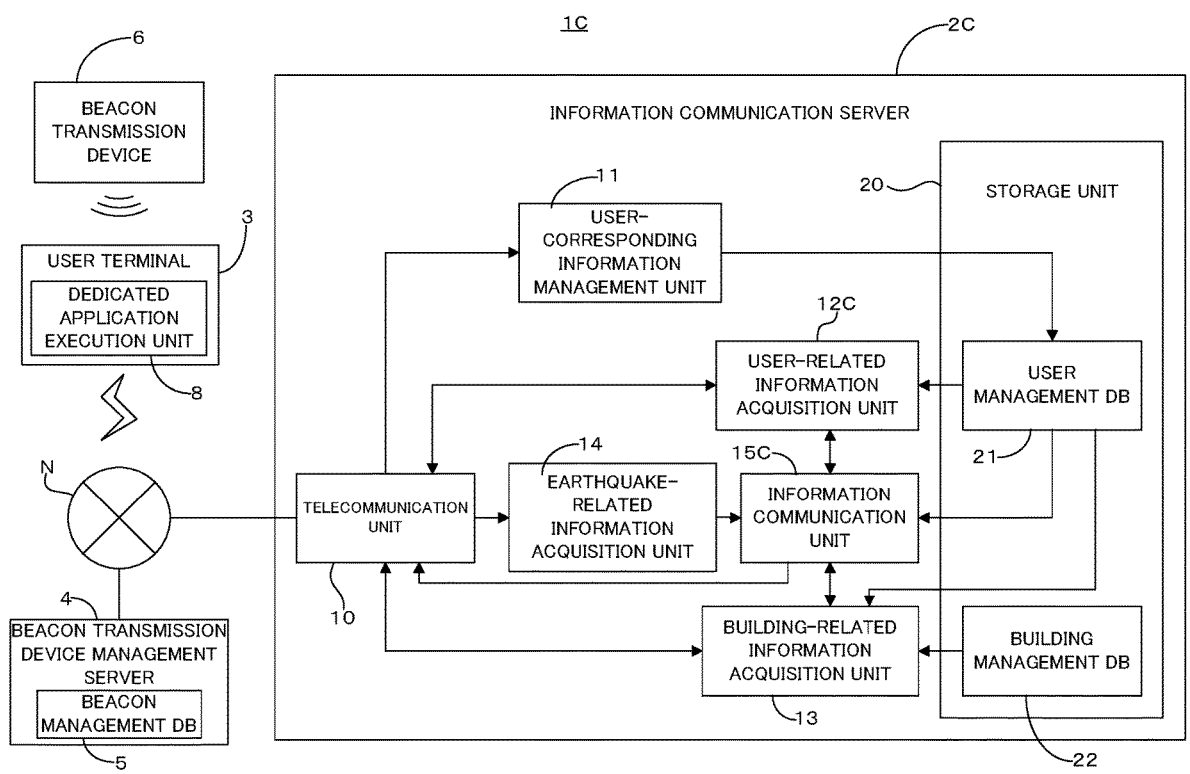
FIG. 8 is a block diagram illustrating a function configuration example of an information communication server and a user terminal according to a fourth embodiment of the invention.

Next, a fourth embodiment will be described. FIG. 8 is a block diagram illustrating a functional configuration of the user terminal 3 and an information communication server 2C of a system 1C for communicating information relating to a long period ground motion according to the fourth embodiment. In the fourth embodiment, the same reference numerals will be applied to the same elements as those of the first embodiment, and the detailed description thereof will be omitted. As it is obvious from the comparison between FIG. 3 and FIG. 8, the information communication server 2C includes a user-related information acquisition unit 12C instead of the user-related information acquisition unit 12, and includes an information communication unit 15C instead of the information communication unit 15.

In this embodiment, the contents of the information that is acquired by the user-related information acquisition unit 12C, and the contents of the drawing data that is generated by the information communication unit 15C are different from those of the first embodiment described above, and thus, such a difference will be mainly described.

The user-related information acquisition unit 12C acquires the user property information (refer to FIG. 2(B)), in addition to the information that is acquired by the user-related information acquisition unit 12 in the first embodiment, in accordance with the request of the information communication unit 15C. The user-related information acquisition unit 12C outputs the user property information to the information communication unit 15C, along with the other information. Note that, the user property information is collected by means such as a questionnaire that is performed on a user interface provided to the user in the user registration, and then, is registered in the record of the user management DB 21.

The user property information is the information relevant to the properties of the user. The properties of the user are individual properties of the user such as an age, a gender, and the presence or absence of a disorder, and are physical and psychological properties that affect the evacuation at the time of an earthquake. Here, it is considered that when an earthquake occurs, a suitable evacuation method is different in accordance with the individual properties. For example, in a case where it is expected that the user is difficult to agilely move or is weak, in accordance with an age, it may be better to stay at the place and take a suitable measure than to evacuate through the evacuation route.

As with the information communication unit 15 of the first embodiment, the information communication unit 15C generates the drawing data for displaying an information communication screen G2. At this time, the information communication unit 15C generates the drawing data such that information according to the properties of the user is added to the information communication screen G2 that is displayed on the basis of the drawing data, on the basis of the user property information that is input from the user-related information acquisition unit 12C.

Specifically, in this embodiment, useful information is stored in a predetermined storage region by the evacuation of the user including the element, for each element included in the user property information (in a case where the user property information includes a plurality of elements, for each combination of the plurality of elements). For example, the user property information includes an age (in this case, for example, an age sorted into "to 10s", "20s to 50s", "from 60s", and the like) and a gender as the element, a wording representing matters to be attended to the evacuation, a wording indicating advice for smooth evacuation, and the like are stored for each combination of the age and the gender. The information communication unit 15C acquires information associated with the element included in the user property information (or the combination of each of the elements), and generates the drawing data for displaying the information communication screen G2 to which the information is added.

As a result thereof, information relevant to an evacuation suitable for the properties of the user is displayed on the information communication screen G2 that is visually recognized by the user. The user is capable of evacuating with a method that is more suitable for the user, on the basis of the information.

As described above, each of the embodiments of the invention has been described. Here, each of the embodiments described above is merely an example for specification in the implement of the invention, and the technical scope of the invention is not restrictively interpreted by the embodiments. That is, the invention can be implemented in various forms without departing from the gist or the main characteristics thereof.

For example, in each of the embodiments described above, the beacon transmission device 6 installed in the building is used at the time of specifying the building at which the user stays, the floor of the building, and the position of the user in a planar region on the floor. However, such specification may be performed by not only a method using the beacon transmission device 6 but also any method insofar as the position of the user and the like can be specified with a considerable accuracy. For example, in a case where the user terminal 3 performs telecommunication with respect to an access point provided in the building by using a wireless telecommunication standard such as Wi-Fi (Registered Trademark), the access point may be used instead of the beacon transmission device 6 or along with the beacon transmission device 6. In addition, a wireless IC tag reader may be provided in each place of the building, an IC tag implemented in the user terminal 3 of the user moving in the building may be read, and thus, the position of the user and the like can be specified on the basis of a read result. In addition, the position of the user and the like may be specified on the basis of a detection result of a GPS unit, an altitude sensor, or the like that is implemented in the user terminal 3.

In addition, for example, in each of the embodiments described above, the beacon signal has been described as a signal including the beacon ID. However, this is the simplification of the information included in the beacon ID for simplicity of the description. Accordingly, the other information may be included in the beacon ID, and the system may use the other information. For example, in the first embodiment, a part or all of the building ID, the installation floor information, and the beacon transmission device position information may be included in the beacon signal, in addition to the beacon ID, the information may be transmitted to the information communication server 2 from the user terminal 3 that receives the beacon signal, and the user-related information acquisition unit 12 and the building-related information acquisition unit 13 may acquire the information that is received from the user terminal 3.

In addition, for example, in the first embodiment described above, the information communication unit 15 calculates the shaking level and the time required for occurrence to be communicated to the user. In this regard, only the shaking level (or information relevant to the state of the other shaking) may be calculated without calculating the time required for occurrence, and may be communicated. In addition, the information relevant to the state of the other shaking may be calculated instead of the shaking level or along with the shaking level, and may be communicated. The information relevant to the other shaking is, for example, information indicating how the shaking occurs, information indicating how long the shaking continues, and the like. In addition, a clock time at which the long period ground motion starts may be calculated instead of the time required for occurrence, and may be communicated. The same also applies to the other embodiments.

In addition, in the first embodiment described above, the information communication unit 15 communicates the information to the user by the push communication with respect to the user terminal 3. Here, an information communication method is not limited to such a method, and for example, may be an e-mail. Here, the push communication is most suitable from the viewpoint that the information can be instantaneously conveyed. The same also applies to the second embodiment and the fourth embodiment.

In addition, in the first embodiment described above, the user terminal 3 may have the function of the information communication unit 15. In this case, for example, the information may be communicated to the user in the following procedure. That is, each of the information items acquired by the earthquake-related information acquisition unit 14, the user-related information acquisition unit 12, and the building-related information acquisition unit 13 is transmitted to the user terminal 3 from the information communication server 2. In the user terminal 3, the dedicated application execution unit 8 that functions as the "information communication unit" receives each of the information items, and calculates the shaking level and the time required for occurrence to be communicated to the user, on the basis of each of the information items. In addition, the user terminal 3 may have any one or two functions in the functions of the earthquake-related information acquisition unit 14, the user-related information acquisition unit 12, and the building-related information acquisition unit 13, in addition to the function of the information communication unit 15. The same also applies to the second embodiment and the fourth embodiment.

In addition, in the first embodiment described above, the information relevant to the long period ground motion is communicated by displaying the information on the touch panel 7 of the user terminal 3. In this regard, the information may be communicated by using a voice, instead of the display or along with the display. The same also applies to the second embodiment to the fourth embodiment.

In addition, in the first embodiment described above, the information communication screen G1 (may be the message M1) may include information for advising on a suitable behavior based on the position of the user and the surroundings of the user, on the basis of the position of the user in the planar region on the floor. For example, in a case where the user is in the own seat in an office, advice to hide under a desk may be displayed, or in a case where the user is in the vicinity of an elevator, advice not to take the nearby elevator since the building will significantly shake due to the long period ground motion in a few minutes may be displayed. Here, in this case, it is necessary to include information necessary for providing such advice (for example, a more detailed map of the floor, information relevant to a disposition state of devices, building services, and the like that are disposed on the floor) in the record of the building management DB 22, on the basis of the position of the user.

REFERENCE SIGNS LIST 1, 1A, 1B, 1C System for communicating information relating to long period ground motion
2, 2A, 2B, 2C Information communication server (server for communicating information relating to long period ground motion)
3, 3A, 3B User terminal (mobile terminal)
12, 12A, 12B, 12C User-related information acquisition unit
13, 13A, 13B Building-related information acquisition unit
14, 14B Earthquake-related information acquisition unit
15, 15B, 15C Information communication unit

The invention claimed is:

1. A system for communicating information relating to a long period ground motion, characterized by comprising:
a user-related information acquisition unit acquiring information indicating a floor on which a user stays in a building at which the user stays, with respect to the user staying at the building including a plurality of floors and moving with a mobile terminal;
a building-related information acquisition unit acquiring information that is relevant to a position and a structure of the building at which the user stays and is used at the time of calculating a state of shaking that occurs due to the long period ground motion on each of the floors of the building;
an earthquake-related information acquisition unit acquiring information that is relevant to a state of an earthquake that occurs and is used at the time of calculating the state of the shaking that occurs due to the long period ground motion on each of the floors of the building at which the user stays; and
an information communication unit calculating the state of the shaking that occurs on the floor of the building at which the user stays due to the long period ground motion associated with the earthquake that occurs by reflecting the floor on which the user stays in the building, the position and the structure of the building, and the state of the earthquake that occurs, on the basis of each of the information items acquired by the user-related information acquisition unit, the building-related information acquisition unit, and the earthquake-related information acquisition unit, to communicate information according to the calculated state of the shaking to the user through the mobile terminal possessed by the user, wherein the user-related information acquisition unit acquires information indicating a position of the user in a planar region on the floor of the building at which the user stays, and the information communication unit calculates a size of the shaking that occurs on the floor of the building at which the user stays due to the long period ground motion, and displays a screen on which a floor map which includes the position of the user in the planar region on the floor of the building at which the user stays, information relevant to an evacuation in the planar region, and information indicating the calculated size of the shaking are displayed on the mobile terminal.

2. The system for communicating information relating to a long period ground motion according to claim 1, characterized in that the information communication unit further calculates a time predicted to be required until the shaking that occurs on the floor of the building at which the user stays due to the long period ground motion starts or a clock time at which the shaking is predicted to start, and communicates information indicating the time or the clock time.

3. The system for communicating information relating to a long period ground motion according to claim 2, characterized in that the user-related information acquisition unit further acquires information indicating individual properties of the user, and the information communication unit communicates information according to the calculated state of the shaking and the individual properties of the user that are indicated by the information acquired by the user-related information acquisition unit.

4. The system for communicating information relating to a long period ground motion according to claim 1, characterized in that the user-related information acquisition unit further acquires information indicating individual properties of the user, and the information communication unit communicates information according to the calculated state of the shaking and the individual properties of the user that are indicated by the information acquired by the user-related information acquisition unit.

5. A server for communicating information relating to a long period ground motion that is capable of performing telecommunication with respect to a mobile terminal possessed by a user through a network, characterized by comprising:

a user-related information acquisition unit acquiring information indicating a floor on which the user stays in a building at which the user stays, with respect to the user staying at the building including a plurality of floors and moving with a mobile terminal;

a building-related information acquisition unit acquiring information that is relevant to a position and a structure of the building at which the user stays and is used at the time of calculating a state of shaking that occurs due to the long period ground motion on each of the floors of the building;

an earthquake-related information acquisition unit acquiring information that is relevant to a state of an earthquake that occurs and is used at the time of calculating the state of the shaking that occurs due to the long period ground motion on each of the floors of the building at which the user stays; and an information communication unit calculating the state of the shaking that occurs on the floor of the building at which the user stays due to the long period ground motion associated with the earthquake that occurs by reflecting the floor on which the user stays in the building, the position and the structure of the building, and the state of the earthquake that occurs, on the basis of each of the information items acquired by the user-related information acquisition unit, the building-related information acquisition unit, and the earthquake-related information acquisition unit, to transmit information according to the calculated state of the shaking to the mobile terminal possessed by the user, wherein the user-related information acquisition unit acquires information indicating a position of the user in a planar region on the floor of the building at which the user stays, and the information communication unit calculates a size of the shaking that occurs on the floor of the building at which the user stays due to the long period ground motion, and displays a screen on which a floor map which includes the position of the user in the planar region on the floor of the building at which the user stays, information relevant to an evacuation in the planar region, and information indicating the calculated size of the shaking are displayed on the mobile terminal.

6. A mobile terminal possessed by a user, characterized by comprising:

a user-related information acquisition unit acquiring information indicating a floor on which the user stays in a building at which the user stays, with respect to the user staying at the building including a plurality of floors and moving with a mobile terminal;

a building-related information acquisition unit acquiring information that is relevant to a position and a structure of the building at which the user stays and is used at the time of calculating a state of shaking that occurs due to a long period ground motion on each of the floors of the building;

an earthquake-related information acquisition unit acquiring information that is relevant to a state of an earthquake that occurs and is used at the time of calculating the state of the shaking that occurs due to the long period ground motion on each of the floors of the building at which the user stays; and an information communication unit calculating the state of the shaking that occurs on the floor of the building at which the user stays due to the long period ground motion associated with the earthquake that occurs by reflecting the floor on which the user stays in the building, the position and the structure of the building, and the state of the earthquake that occurs, on the basis of each of the information items acquired by the user-related information acquisition unit, the building-related information acquisition unit, and the earthquake-related information acquisition unit, to output and communicate information according to the calculated state of the shaking to the user, wherein
the user-related information acquisition unit acquires information indicating a position of the user in a planar region on the floor of the building at which the user stays, and
the information communication unit calculates a size of the shaking that occurs on the floor of the building at which the user stays due to the long period ground motion, and displays a screen on which a floor map which includes the position of the user in the planar region on the floor of the building at which the user stays, information relevant to an evacuation in the planar region, and information indicating the calculated size of the shaking are displayed.

7. A method for communicating information relating to a long period ground motion, characterized by comprising:
a first step of allowing a user-related information acquisition unit of a system for communicating information relating to a long period ground motion to acquire information indicating a floor on which a user stays in a building at which the user stays, with respect to the user staying at the building including a plurality of floors and moving with a mobile terminal, a building-related information acquisition unit of the system for communicating information relating to a long period ground motion to acquire information that is relevant to a position and a structure of the building at which the user stays and is used at the time of calculating a state of shaking that occurs due to the long period ground motion on each of the floors of the building, and an earthquake-related information acquisition unit of the system for communicating information relating to a long period ground motion to acquire information that is relevant to a state of an earthquake that occurs and is used at the time of calculating the state of the shaking that occurs due to the long period ground motion on each of the floors of the building at which the user stays; and
a second step of allowing an information communication unit of the system for communicating information relating to a long period ground motion to calculate the state of the shaking that occurs on the floor of the building at which the user stays due to the long period ground motion associated with the earthquake that occurs by reflecting the floor on which the user stays in the building, the position and the structure of the building, and the state of the earthquake that occurs, on the basis of each of the information items acquired by the user-related information acquisition unit, the building-related information acquisition unit, and the earthquake-related information acquisition unit, to communicate information according to the calculated state of the shaking to the user through the mobile terminal possessed by the user, wherein
in the first step, the user-related information acquisition unit acquires information indicating a position of the user in a planar region on the floor of the building at which the user stays, and
in the second step, the information communication unit calculates a size of the shaking that occurs on the floor of the building at which the user stays due to the long period ground motion, and displays a screen on which a floor map which includes the position of the user in the planar region on the floor of the building at which the user stays, information relevant to an evacuation in the planar region, and information indicating the calculated size of the shaking are displayed on the mobile terminal.

\* \* \* \* \*